United States Patent [19]

DuBois et al.

[11] Patent Number: 4,831,979
[45] Date of Patent: May 23, 1989

[54] WRIST PIN LUBRICATION SYSTEM FOR TWO-CYCLE ENGINES

[75] Inventors: Chester G. DuBois, Zion; David F. Haman, Waukegan, both of Ill.

[73] Assignee: Outboard Marine Corporation, Waukegan, Ill.

[21] Appl. No.: 43,108

[22] Filed: Apr. 27, 1987

[51] Int. Cl.$^4$ .............................................. F01M 3/00
[52] U.S. Cl. ........................... 123/196 M; 123/196 R; 92/156; 92/159; 184/6.5
[58] Field of Search .................... 184/6.5, 6.6, 6.7, 6.8; 123/196 R, 196 M; 92/156, 159

[56] References Cited

U.S. PATENT DOCUMENTS

| | | | |
|---|---|---|---|
| 850,718 | 4/1907 | Ash | 184/6.5 |
| 921,129 | 5/1909 | Link | 184/6.5 |
| 1,257,258 | 2/1918 | Lemp et al. | 184/6.5 |
| 1,447,313 | 3/1923 | MacDonald | 184/6.5 |
| 2,060,752 | 11/1936 | Celander et al. | 184/6.5 X |
| 2,128,065 | 8/1938 | Aikman | 184/6.5 |
| 2,583,583 | 1/1952 | Mangan | 184/6.5 X |
| 2,661,253 | 12/1953 | Barlow et al. | 184/6.5 X |
| 2,936,748 | 5/1960 | Jensen | 184/6.5 X |
| 2,983,334 | 5/1961 | Dalrymple | 184/6.5 |
| 3,144,095 | 8/1964 | Trapp et al. | 184/6.5 |
| 3,217,978 | 11/1965 | Harlin | 184/6.5 X |
| 4,201,176 | 5/1980 | Lustgarden | 184/6.5 X |
| 4,280,455 | 7/1981 | Yamaguchi et al. | 123/196 M |

*Primary Examiner*—Leonard E. Smith
*Attorney, Agent, or Firm*—John T. Synnestvedt; Richard D. Weber

[57] ABSTRACT

A wrist pin lubricating system for a multi-cylinder two-cycle engine comprises a passage system for collecting and distributing crankcase condensate to the piston wrist pin bearings. A slot in each piston skirt provides continuous communication between each wrist pin bearing and a passage in the cylinder wall delivering condensate from the engine crankcases. The condensate is collected at the low point of each crankcase and is pumped to the wrist pin bearings by the pressure differential between two crankcases. Check valves are provided in the passages to maintain a directional flow of the condensate.

13 Claims, 1 Drawing Sheet

WRIST PIN LUBRICATION SYSTEM FOR TWO-CYCLE ENGINES

BACKGROUND OF THE INVENTION

The present invention relates generally to multicylinder two-cycle engines and relates more particularly to a wrist pin lubrication system for such engines.

In the type of two-cycle engine wherein the air/fuel charge is compressed within the crankcase preparatory to entry into the combustion chamber, lubrication of the crankshaft, crank and wrist pin bearings as well as the piston and cylinder is provided by a lubricant added to the fuel. The mixture of fuel and lubricant enters the crankcase as a mist which penetrates into the bearing regions and provides lubrication to the moving parts.

The wrist pin bearing, due to its location within the reciprocating piston as well as centrifugal effects, may not receive an adequate amount of lubricant, especially with the high fuel-lubricant ratios of modern engines. As a result, undue friction, wear and a potential for wrist pin bearing failure may occur with conventional two-cycle engine lubrication systems. Efforts to improve the penetration of the mist into the wrist pin bearing have included a hole or series of holes, or slots in the connecting rod to direct the fuel/lubricant mist toward the wrist pin bearing. However, centrifugal forces produced by the high speed movement of the connecting rod inhibits lubricant movement toward the wrist pin region.

BRIEF SUMMARY OF THE INVENTION

In the present invention, a passage system is provided for collecting and distributing lubricant condensate to the wrist pin bearings. The condensate is collected at the low points of each crankcase and is pumped through the passages by the pressure differential between two crankcases. Check valves are provided in the passages to maintain a directional flow of the condensate.

A slot in the skirt of each piston communicates continuously with a port in the cylinder wall communicating with the condensate passages. The piston slot opens into the upper end of the wrist pin bore, permitting lubricant to flow into the hollow wrist pin and into the wrist pin bearing through a port in the wrist pin. Suitable means are provided to prevent lubricants from passing directly through the wrist pin. In the preferred embodiment of the invention, the lubricant passages in the crankcase pass through the crankshaft bearings and thus serve the dual role of lubricating the crankshaft bearings as well as the wrist pin bearings.

It is accordingly a primary object of the present invention to provide a wrist pin lubrication system for multi-cylinder two-cycle engines.

Another object of the invention is to provide a system as described wherein the lubricant source comprises condensate of the fuel/lubricant mist collected from the engine crankcases.

Still another object of the invention is to provide a system as described which can also serve to lubricate the engine crankshaft bearings.

Additional objects and advantages of the invention will be more readily apparent from the following detailed description of an embodiment thereof when considered in conjunction with the attached drawings.

DESCRIPTION OF THE PREFERRED EMBODIMENT

Figure 1:
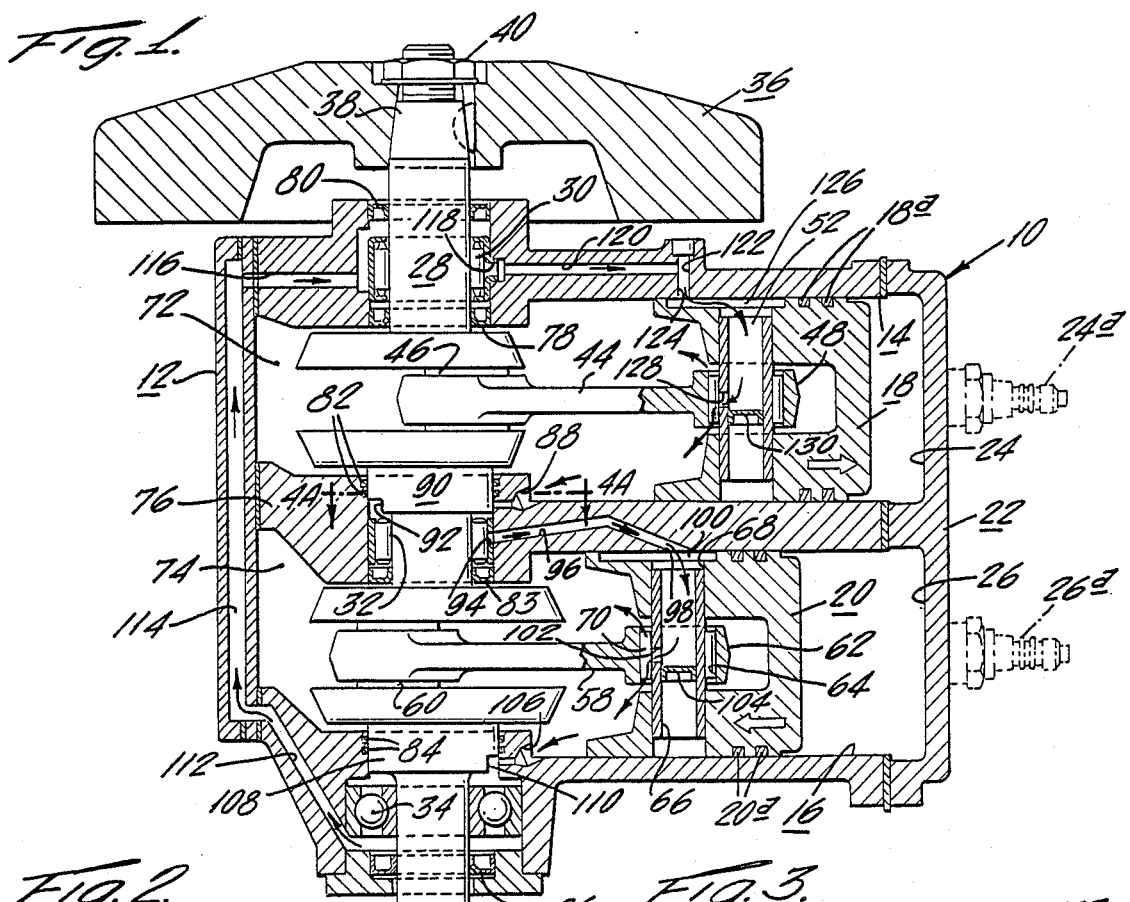
FIG. 1 is a sectional view taken through the vertical axis of a two-cycle engine having a wrist pin lubrication system in accordance with the present invention.

Referring to the drawings and particularly FIG. 1 thereof, a two-cycle engine generally designated 10 is illustrated having a wrist pin lubrication system in accordance with the present invention. The engine 10, aside from the lubrication system, is of a conventional construction and includes an engine block 12 defining upper and lower horizontal cylinders 14 and 16 within which pistons 18 and 20 are respectively slideably disposed. A cylinder head 22 in conjunction with the cylinders and pistons forms the upper and lower combustion chambers 24 and 26, into which open respectively the schematically shown spark plugs 24a and 26a.

A crankshaft 28 extends vertically through the engine block, being rotatably supported by upper, intermediate and lower bearing assemblies 30, 32 and 34 disposed in apertures in the engine block walls. A flywheel 36 is secured on the upper threaded end 38 of the crankshaft 28 by means of nut 40. The lower end 42 of the crankshaft extends from the engine to provide power, for example to the propeller shaft of an outboard motor.

A connecting rod 44 extends between the upper crank 46 of the crankshaft to the piston 18, the outer end 48 of the connecting rod having a bore 50 therein for receiving the hollow wrist pin 52 passing through transverse bore 54 in the piston 18. Needle bearing assembly 56 disposed within bore 50 of the connecting rod outer end provides a low friction pivotal attachment of the connecting rod to the piston.

In a similar manner, a second connecting rod 58 extends between the lower crank 60 of the crankshaft and the piston 20, the outer end 62 of the connecting rod 58 including a bore 64 through which passes the hollow wrist pin 66 secured within bore 68 of the piston 20. A needle bearing assembly 70 is disposed in the bore 64 of the connecting rod outer end 62.

The illustrated engine 10 is of a conventional two-cycle type wherein the air-fuel-oil charge is initially introduced into the region beneath the piston during the compression stroke and is then pumped by the piston power stroke into the combustion chamber after the inlet port is cleared by the piston. In such an engine, the space beneath each piston, commonly known as the crankcase, must be sealed, particularly from the adjoining crankcase. The present engine block accordingly is constructed to define upper and lower crankcases 72 and 74 which are alternately increased and decreased in volume by the reciprocating movement of the respective pistons 18 and 20. The crankcase 72 is separated from the crankcase 74 by the internal engine block wall 76 which supports the intermediate crankshaft bearing 32.

In order to prevent leakage into or from the upper and lower crankcases 72 and 74, seal means are required at those points where the crankshaft 28 passes through the engine block walls. The seal means includes inner and outer seals 78 and 80 flanking the upper bearing assembly 30, intermediate seals 82 and 83 in the engine block 76 flanking the intermediate bearing 32, and inner and outer seals 84 and 86 flanking the lower bearing assembly 34.

The structure thus far described, aside from the use of two seals for the upper and intermediate crankshaft bearings, is conventional to two-cycle engines and provides a background for the prsent lubrication system described below. Some engine detail has been omitted from the present disclosure, such as fuel delivery valves and passages but such omitted structure is also conventional and is not needed for a clear understanding of the invention.

In the present invention, the condensate from the fuel-oil mist which collects in the lowest part of each crankcase 72 and 74 is pumped by the differential pressure between the two crankcases through a series of ports, passages and check valves to the piston wrist pins to lubricate the wrist pin bearings. Specifically, when the pressure is higher in crankcase 72 than in crankcase 74, condensate collecting in the bottom of the upper crankcase 72 is pumped into passage 88 in the engine block wall 76 and into the intermediate bearing 32. Seal 83 prevents the condensate from flowing directly into the lower crankcse 74.

Figure 4A:
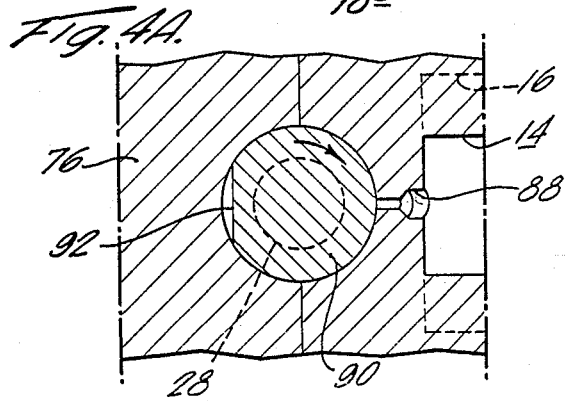
FIG. 4A is an enlarged sectional view taken along line 4A—4A of FIG. 1 showing details of the rotary valve separating the upper and lower crankcase chambers, the valve being shown in the closed position.
Figure 4B:
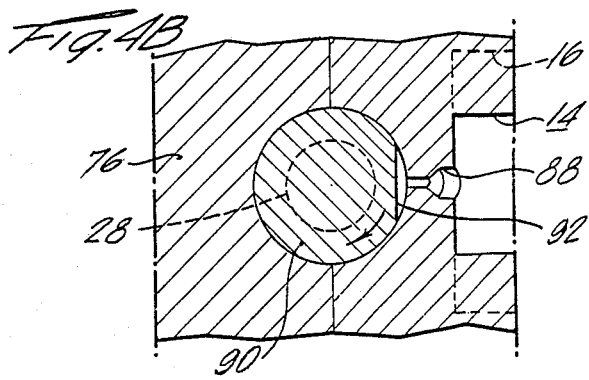
FIG. 4B is a view similar to FIG. 4A but showing the crankshaft rotated through 180° and the rotary valve in the open position.

The passage 88 is opened and closed in accordance with the pressure condition of the crankcase 72 by means of a rotary valve 90. As shown in FIGS. 4A and 4B, the rotary check valve comprises simply a notch 92 in the portion of crankshaft 28 adjacent the passage 88. When, as shown in FIG. 4B, the notch 92 is in communication with the passage 88, condensate may flow from the crankcase 72 into the bearing 32. When as shown in FIG. 4A, the notch 92 is out of communication with the passage 88, the passage 88 is effectively blocked. As described hereinbelow, this arrangement prevents a back flow of condensate under certain relative pressure conditions of the upper and lower crankcases.

A port 94 in the bearing 32 communicates with a passage 96 in the engine block wall 76, the passage 96 opening into the wall of cylinder 16 at a port 98. A slot 100 in the outer wall of the piston is of a sufficient length so as to always communicate with the port 98 during any position of the piston. The slot 100 communicates with the wrist pin bore 68, thus permitting condensate to be pumped from passage 96 through slot 100 into the hollow wrist pin 66.

A port 102 substantially in the center of the wrist pin permits condensate to flow into the needle bearing assembly 70 to lubricate the bearing. As shown by the drawing arrows, the condensate flows from the bearing 70 into the lower crankcase 74. A plug 104 disposed within the wrist pin just below the port 102 prevents a flow of condensate through the wrist pin.

A similar collection and delivery arrangement is provided for condensate collecting in the bottom of the lower crankcase 74. This arrangement includes a passage 106 for delivering condensate from the bottom of the crankcase 74 into the lower crankshaft bearing 34, and a rotary valve 108 comprising a notch 110 in the crankshaft serving to open and close the passage 106 in the same manner as that described with respect to the rotary valve 90.

Figure 2:
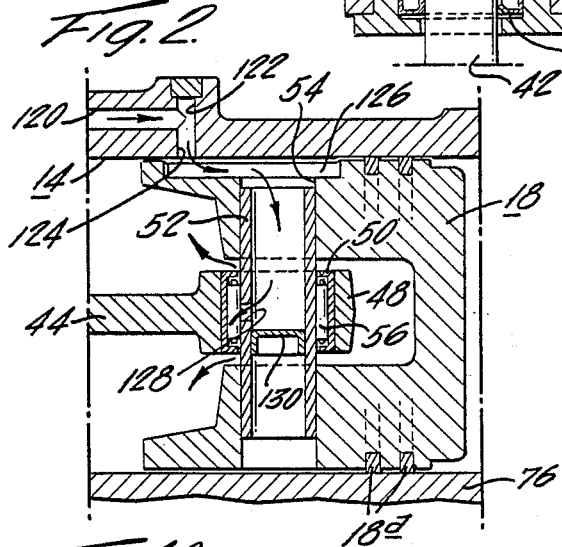
FIG. 2 is an enlarged sectional view of the wrist pin area of the upper cylinder of the engine of FIG. 1 showing the lubricant flow path.

After passing through the bearing assembly 34, the condensate from the crankcase 74 passes through passages 112 and 114 in the engine block, and through passage 116 into the upper crankshaft bearing assembly 30. A port 118 in the bearing assembly 30 communicates with a passage 120 in the engine block which in turn leads into passage 122 which opens at port 124 into the cylinder 14. The slot 126 in the piston 18 is of a sufficient extent to continuously communicate with the port 124. The slot 126 opens into the piston bore 54(FIG. 2), thereby permitting a flow of condensate into the hollow wrist pin 52. A port 128 substantially in the center of the wrist pin 52 permits condensate to flow from the interior of the wrist pin into the wrist pin bearing assembly 56, from which, as indicated by the arrows, it flows into the upper crankcase 72. A plug 130 in the wrist pin 52 just below the port 128 prevents condensate from passing downwardly through the wrist pin.

The operation of the present system is evident from the above description and the drawings illustrating the condensate flow paths. When the movement of the piston 18 is such as to pressurize the crankcase 72, the rotary valve 90 opens to permit condensate accumulated in the crankcase 72 to flow through passage 88, through the bearing assembly 32, port 94, passage 96 and out through port 98 into the piston slot 100. The pressurized condition of the crankcase 72 corresponds to a low pressure or vacuum condition of the crankcase 74 and accordingly the condensate will readily flow through the described passages, into the hollow wrist pin 66 and out through wrist pin port 102 into the wrist pin bearing 70. At such a time as the piston movement causes a reversal of the relative pressure conditions of the crankcases 72 and 74, the rotary valve 90 is closed to prevent back flow of condensate along the described flow path.

When the piston movement creates a pressurized condition of the lower crankcase 74 and a corresponding low pressure or vacuum condition of the upper crankcase 72, the rotary valve 90 will be closed, and the rotary valve 108 opened to permit condensate from the crankcase 74 to flow through passage 106, through bearing assembly 34, passages 112, 114 and 116, bearing assembly 30, port 118, passages 120 and 122 and port 124 into slot 126 of the piston 18. In view of the low pressure or vacuum condition of the crankcase 72, condensate passing into the piston slot 126 will flow through the hollow wrist pin 52 and through the port 128 thereof to lubricate the wrist pin bearing assembly 56 from which the condensate flows into the crankcase 72.

The piston slots 100 and 126 are essentially sealed from the combustion chambers and the crankcases respectively by the piston rings and the piston skirt so that changing pressure conditions in these regions do not significantly effect the flow of condensate through the described flow path.

The need for seals on each side of the crankshaft bearings is apparent when the operation of the system is considered. If these seals were not present, the pumped lubricant would enter the lower pressure crankcase directly from the crankshaft bearings rather than through the wrist pin bearings as desired.

Figure 3:
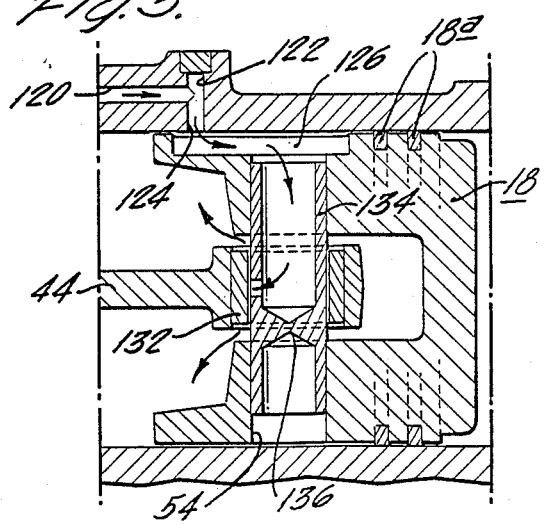
FIG. 3 is a view similar to FIG. 2 but showing a modified embodiment wherein the connecting rod includes a sleeve type wrist pin bearing rather than a needle bearing.

A modified form of the invention is illustrated in FIG. 3. In this embodiment, sleeve bearing 132 is substituted for the needle bearing assembly 56 although the lubrication path through the wrist pin to the bearing remains the same. The wrist pin 134 is of a slightly different structure than the wrist pins 52 and 66 only in the provision of an integral wall 136 in place of the plugs 104 and 130 of the embodiment of FIGS. 1 and 2. The wall 136 functions in the same manner as the plugs to prevent condensate flow through the wrist pin.

Although the invention has been described with respect of a two-cylinder engine, it will be apparent that the invention is also applicable to other multi-cylinder engines. The cylinders connected by the lubricating system need not be adjoining cylinders, but should be substantially opposed in their operating cycles to maximize the pressure differential and hence the lubricant pumping function.

Although the check valves illustrated and described are of the rotary type, other types of check valves such as ball type check valves could be used to provide the directional flow of the condensate.

Although a vertical crankshaft engine has been illustrated, the present system is also applicable to a horizontal crankshaft engine since the lubricant flow results from the pressure differential between two crankcases rather than a gravity flow of the lubricant.

The lubricant flow passages are preferably provided within the crankcase walls as illustrated. However, the passages could also be defined in whole or in part by other means, such as hoses or conduits.

Manifestly, changes in details of construction can be effected by those skilled in the art without departing from the invention.

We claim:

1. A wrist pin lubrication system for a two-cycle internal combustion engine including at least two cylinders, a sealed crankcase extending from each said cylinder, a piston disposed in each said cylinder for reciprocation therewithin, at least one pair of said pistons being sequentially phased, a crankshaft extending through said crankcases, a connecting rod in each said crankcase operatively connecting each said piston with said crankshaft, the connection of each said piston and connecting rod including a bore in each said piston, a hollow wrist pin in each said piston bore passing through one end of said connecting rod, and a wrist pin bearing in said connecting rod end disposed around said wrist pin; said lubrication system comprising a port in the cylinder wall of each said cylinder, a slot in the skirt of each said piston continuously in communication with said port, said slot communicating with the piston wrist pin bore and hollow wrist pin, a port in each said wrist pin opening into said wrist pin bearing, passage means connecting each said cylinder port with the crankcase of another cylinder having a sequentially phased piston, and a check valve in each said passage means permitting a fluid flow therethrough only in a direction toward said cylinder port, whereby lubricant condensates collecting in the crankcases are pumped through said passage means and through said cylinder ports, piston slots, wrist pins and wrist pin ports into the wrist pin bearings by the pressure differential between the sealed crankcases created by the reciprocating pistons, said check valves ensuring a directional flow of the condensate toward the wrist pin bearings for lubrication thereof.

2. The invention as claimed in claim 1, wherein said crankshaft is rotatably supported by crankshaft bearings, and wherein said passage means pass through at least one of said crankshaft bearings to provide lubrication thereof.

3. The invention as claimed in claim 1, wherein at least one of said check valves comprises a rotary check valve.

4. The invention as claimed in claim 3, wherein said rotary check valve comprises a notch in the crankshaft serving to open said passage means in phase with the pressurized condition of the crankcase communicating with said passage means.

5. The invention as claimed in claim 1, wherein said crankshaft is vertically disposed and wherein said cylinders are horizontally disposed.

6. The invention as claimed in claim 1, including means within said hollow wrist pins for preventing lubricant flow substantially beyond the port therein opening into the wrist pin bearing.

7. The invention as claimed in claim 1 wherein said passage means comprises passages within the crankcase walls.

8. A wrist pin lubrication system for a two-cycle internal combustion engine including at least two cylinders, a sealed crankcase extending from each said cylinder, a piston disposed in each said cylinder for reciprocation therewithin, at least one pair of said pistons being sequentially phased, a crankshaft extending through said crankcases and rotatably supported by a plurality of crankshaft bearings, a connecting rod in each said crankcase operatively connecting each said piston with said crankshaft, the connection of each said piston and connecting rod including a bore in each said piston, a hollow wrist pin in each said piston bore passing through one end of said connecting rod, and a wrist pin bearing in said connecting rod end disposed around said wrist pin: said lubrication system comprising;
- a port in the cylinder wall of each said cylinder,
- a slot in the skirt of each said piston continuously in communication with said port,
- said slot communicating with the piston wrist pin bore and hollow wrist pin,
- a port in each said wrist pin opening into said wrist pin bearing,
- passage means connecting each said cylinder port with the crankcase of another cylinder having a sequentially phased piston,
- each of said passage means passing through at least one of said crankshaft bearings,
- seals on both sides of each said crankshaft bearing associated with one of said passage means,
- and a check valve in each said passage means permitting a fluid flow therethrough only in a direction toward said cylinder port,
- whereby lubricant condensates collecting in the crankcases are pumped through said passage means and bearings and through said cylinder ports, piston slots, wrist pins and wrist pin ports into the wrist pin bearings by the pressure differential between the sealed crankcases created by the reciprocating pistons, said check valves ensuring a directional flow of the condensate toward the wrist pin bearings for lubrication thereof.

9. The invention as claimed in claim 8, wherein at least one of said check valves comprises a rotary check valve.

10. The invention as claimed in claim 9, wherein said rotary check valve comprises a notch in the crankshaft serving to open the associated passage means in phase with the pressurized condition of the crankcase communicating with said passage means.

11. The invention as claimed in claim 8, wherein said crankshaft is vertically disposed and wherein said cylinders are horizontally disposed.

12. The invention as claimed in claim 8, including means within said hollow wrist pins for preventing lubricant flow substantially beyond the port therein opening into the wrist pin bearing.

13. The invention as claimed in claim 8 wherein said passage means comprises passages within the crankcase walls.

* * * * *